Patented Sept. 26, 1933

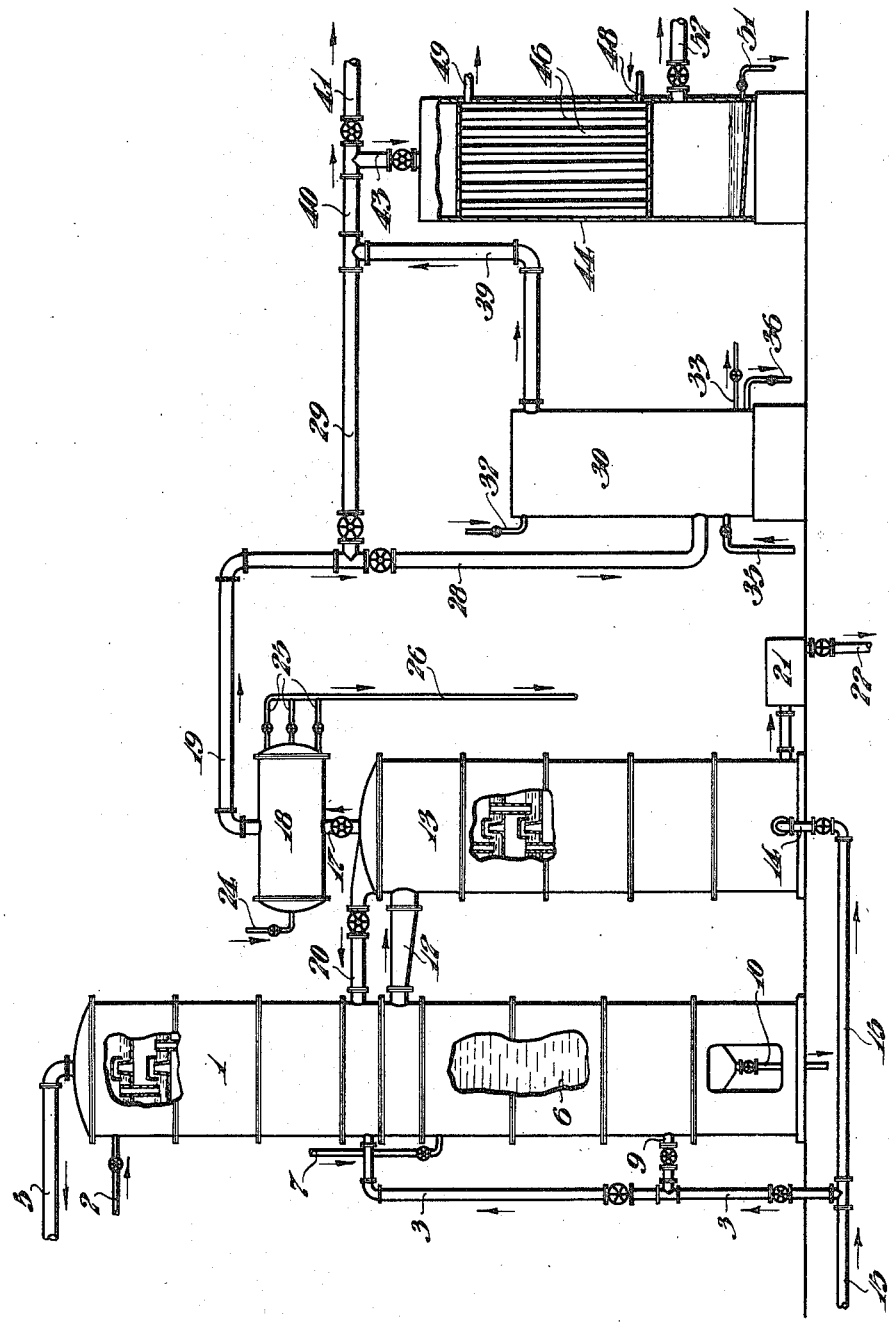

1,928,510

UNITED STATES PATENT OFFICE 1,928,510

PRODUCTION OF PURE AMMONIA

Frederick W. Sperr, Jr., Pittsburgh, Pa., assignor to The Koppers Company of Delaware, a corporation of Delaware Application November 14, 1930
Serial No. 495,641

3 Claims. (Cl. 23—193)

My invention relates to the production of pure ammonia suitable for oxidation and other uses from ammoniacal gas liquor, such as is obtained in the manufacture of fuel gases.

Ammonia for oxidation to nitric oxide in the manufacture of nitric acid, and for various other purposes, such as the preparation of household ammonia and ammonium compounds, must be of a high degree of purity, and must be especially free from acidic impurities such as carbon dioxide, hydrogen sulphide, etc.

The ammonia vapor from the stills used in the recovery of ammonia from gas liquor at gas manufacturing plants, such as coke-oven plants, where ammonium sulphate is produced, contains large quantities of hydrogen sulphide and other impurities. Consequently this vapor is not suitable for oxidation, because the H$_2$S and other impurities cause rapid deterioration of the catalysts which are generally used. The impurities also prevent the utilization of this by-product ammonia in many other processes from which a pure product is desired.

Purification of the vapor from by-product ammonia stills is generally necessary before the ammonia so obtained is suitable for chemical utilization. The available methods of accomplishing this in the past, however, have been very expensive to operate and have required great skill to obtain satisfactory results.

An object of my present invention is to provide a process by means of which ammonia of the purity required for oxidation and other purposes can be obtained from ammoniacal gas liquor, and suitable apparatus therefor.

A second object of my invention is to so modify the usual method of operating ammonia liquor stills that pure ammonia is obtained during the distillation.

My invention has for further objects such other operative advantages and results as may hereinafter be found to obtain.

It is known that gas liquor or ammonia liquor usually contains ammonia in two forms, known as free ammonia and fixed ammonia. The free ammonia is that portion which is uncombined, or which is contained in compounds such as ammonium sulphide and ammonium carbonate that are dissociated at the temperatures obtaining in low pressure steam distillation. Fixed ammonia is contained in more stable compounds, such as chlorides, which are not so readily decomposed.

It is common practice, therefore, to recover ammonia from the gas liquor in two steps; the free ammonia is first removed by distillation with steam or other suitable vapor in the free still; the liquor is then mixed with a lime suspension, or some other suitable alkaline material, to liberate the fixed ammonia; and this mixture is then subjected to further distillation in the fixed still to remove the liberated ammonia. The vapors from the fixed ammonia still are generally passed into the bottom of the free still and in passing upwardly through the free still they serve, at least in part, to remove free ammonia from further quantities of liquor.

In the ordinary distillation process, some of the impurities are driven off with the free ammonia in the free still, so that the liquor leaving this still is partially free from volatile impurities. I have found that little trouble or expense is required to insure that substantially complete removal of hydrogen sulphide and other undesirable impurities is always obtained during this stage of the distillation. The fixed ammonia remaining in the liquor can then be removed in the usual manner and it leaves the fixed still with a very low concentration of impurities of any kind and substantially no acidic impurities such as hydrogen sulphide and carbon dioxide.

When the impurities are substantially removed in the free still in this manner, treatment of the liquor with lime prior to removal of the fixed ammonia performs the double function of liberating the ammonia and fixing any remaining acidic impurities, which are then discharged as calcium salts in the still waste.

In my present invention I provide for separate removal of this pure ammonia from the fixed still, for oxidation or any other desired use. Before use, the vapors may be passed through a dephlegmator to increase the concentration of ammonia and the vapors may then be scrubbed to effect further purification, if desired. The resulting pure vapors may be condensed to a liquor from which the ammonia is vaporized as required, or they may be sent directly to the oxidation plant or other point of consumption.

With the objects set forth hereinabove and other objects in view, I now describe with reference to the accompanying drawing a preferred method by which my improved process of ammonia liquor distillation with the recovery of pure ammonia may be practiced. In the drawing, The single figure is a view, partly in elevation and partly in vertical section, of apparatus suitable for the application of my present invention.

Gas liquor or ammonia liquor is introduced into a free ammonia still 1 from a pipe 2. This free still 1 is preferably a part of an installation of the well-known Koppers type for the recovery of ammonia from gas liquor, but some other type of ammonia still may be substituted. Steam at a suitable pressure is introduced near the bottom of the still 1 from a pipe 3. In passing upwardly through the still, this steam removes free ammonia and other volatile constituents from the descending liquor.

The quantity of steam used in this still is regulated so that substantially all of the hydrogen sulphide and other volatile impurities are removed along with the free ammonia and discharged in the vapors leaving the still through a pipe 5. These vapors may be returned to the gas stream and passed into an ammonium sulphate saturator, or condensed, or otherwise disposed of, as desired.

The liquor from the free still 1 containing fixed ammonia, but substantially free from volatile acidic impurities, then enters a lime chamber or mixing chamber 6, which may conveniently be located below the free still 1. In the mixing chamber, the liquor is mixed with milk of lime or some other suitable alkaline suspension or solution which is delivered into chamber 6 from a pipe 7. The mixture is kept agitated by steam introduced near the bottom of the chamber 6 from a pipe 9.

The lime reacts with the ammonia compounds in the liquor to liberate the ammonia therefrom and to fix the acidic constituents as calcium salts. Any lime or other material settling to the bottom of the chamber 6 may be withdrawn through a pipe 10 when desired.

The liquor, usually containing some excess lime in suspension, overflows from the mixing chamber 6 through a pipe 12 into a fixed ammonia still 13. Steam may be supplied to the bottom of this still through a pipe 14 from a steam main 15 which also supplies steam to the free still through pipe 3, or the two stills may be supplied with steam from different sources.

Steam from the pipe 14 passes upwardly through the still 13 and vaporizes ammonia from the descending liquor. Because of the previous removal of hydrogen sulphide, etc., the ammonia vapor obtained from this still 13 is substantially pure. This vapor is discharged from the top of the still 13 through a pipe 17 and a dephlegmator 18 to a pipe 19.

If for any reason it is desired to discontinue the production of pure ammonia, a valve in pipe 17 is closed and the vapors from the top of the still 13 are delivered through a pipe 20 into the bottom of the free still 1, replacing part or all of the steam supplied at other times through the pipe 3. In any case, the liquor leaves the bottom of the fixed still 13 substantially free from ammonia and is discharged through a trap 21 and pipe 22 to a still waste settling basin (not shown) or some other suitable place of disposal.

In the dephlegmator 18, the concentration of ammonia in the vapors from the still 13 is increased by partial condensation of the aqueous vapor. This is generally accomplished by indirect cooling with water, which is brought into the dephlegmator 18 by a pipe 24 and withdrawn through one or more pipes 25 to a discharge pipe 26. The concentration of ammonia in the vapor leaving the dephlegmator can be regulated by adjusting the rate and temperature at which cooling water is supplied. Condensate is returned from the dephlegmator 18 to the still 13 through pipe 17 or through some other suitable passage.

The substantially pure and at least partially dehydrated vapor passes from the dephlegmator through pipe 19 to the intersection of pipes 28 and 29. When further purification of the ammonia is desirable, the vapor is passed through pipe 28 ino a wash box or scrubber 30. In this washer 30, the vapor is bubbled through a suspension of lime, or scrubbed with some other solvent for the impurities remaining in the vapor, the solvent usually being an alkaline solution or suspension, which is supplied as needed through a pipe 32 and discharged for recirculation or other disposal through pipe 33.

If the liquor leaving the free still contains fixed organic bases, such as pyridine salts, which are decomposed by the treatment with lime and volatilized during the subsequent distillation of the liquor in the fixed still, and which are not removed from the vapor by the dephlegmator, it may be desirable to scrub the vapors with a solvent for organic bases. This is accomplished by using a petroleum fraction or some other solvent for pyridine and the like in the scrubber 30. In some cases it may even be desirable to use a series of scrubbers to remove the last traces of organic bases and acidic impurities from the vapor.

The temperature in the scrubber (or scrubbers) 30 can be regulated to prevent or promote condensation of the vapors by indirect heating or cooling, as by suitable coils within the scrubber, or by other means, such as preheating or precooling the scrubbing liquid. When coils are used, steam or cooling water is supplied through a pipe 35, and discharged through a pipe 36. The purified vapor passed from the scrubber 30 through a pipe 39 into a pipe 40.

If this extra scrubbing is not considered a desirable or necessary preparation for the use to which the ammonia is to be put, the vapor may be passed directly from pipe 19 through pipe 29 into pipe 40.

The vapor in pipe 40 is pure and ready for oxidation or other use, beng free from hydrogen sulphide and other harmful impurities. If it is desired to employ this vapor directly, it is allowed to pass on through a pipe 41 to the point of consumption. However, it is sometimes preferable to condense the vapors prior to use. In that case, the vapors are passed from the pipe 40 through a pipe 43 into a condenser 44.

The condenser 44 may conveniently be of the tubular type, as shown. The pure, partially concentrated vapor enters the top of the condenser and passes downwardly through tubes 46 contained therein. During this passage, the vapors are cooled and at least partially condensed by the transfer of their heat to cooling water surrounding the tubes. The cooling water is supplied to the condenser 44 through a pipe 48 and is discharged through a pipe 49.

Condensate, or strong ammonia liquor, collects in a sump near the bottom of the condenser 44. From this sump, it is withdrawn through a pipe 51 for storage or for transfer to the point of consumption, where it may be evaporated and oxidized into nitric acid, or converted into ammonium compounds, or otherwise utilized as desired.

Fixed gases and any uncondensed vapors are allowed to pass from the condenser through a pipe 52, through which they may be returned to an earlier stage of the system or transferred to some other place of disposal, depending upon their composition.

The system of my invention is very simple in construction and economical in operation, requires a minimum amount of operating labor and supervision, and has great flexibility. Temperatures may be so regulated in the dephlegmator and/or the scrubber that the vapor reaching the condenser has any desired concentration of ammonia.

For example, it may contain just sufficient water so that all of the ammonia can be condensed as strong ammonia liquor or aqua ammonia, or enough water may have been previously removed so that after condensation of all the water as aqua ammonia, there is still uncondensed pure ammonia which may then be compressed and/or liquefied for storage and transportation in the anhydrous state, or may be utilized directly.

In some cases it may even be desirable to completely remove water before the vapor reaches the condenser and there to liquefy the pure ammonia by means of refrigeration and/or compression. If it is desired to convert all the vapor into strong ammonia liquor, and the vapor has been so completely dehydrated in the dephlegmator or elsewhere that there is not enough water present to provide for complete condensation of the ammonia as liquor, additional water may be added in the condenser 44, or through a spray (not shown) located in the pipe 43, or in some other suitable manner.

It will be obvious to those skilled in the art that various modifications can be made in the several steps of my process and in the several parts of my apparatus in addition to those mentioned hereinabove without departing from the spirit of my invention, and it is my intention to cover in the claims such changes as may reasonably be included within the scope thereof.

I claim as my invention:

1. The process of obtaining pure ammonia from ammoniacal liquor, which comprises subjecting the ammoniacal liquor to a preliminary distillation with steam in such quantities as to remove substantially completely free ammonia and volatile acidic constituents therefrom, thereafter adding an alkaline solution or suspension to the residual liquor, redistilling the liquor with steam to obtain therefrom substantially pure ammonia vapor, effecting the preliminary distillation with separate steam from the steam for the redistilling step and thereby effecting the substantially complete removal of the volatile acidic constitutents from the liquor prior to the redistilling thereof, withdrawing and recovering the ammonia vapor from redistilling operation separately from the ammonia vapor from the preliminary distillation, and increasing the concentration of ammonia in the vapor from the redistilling operation by at least partial condensation of the water contained therein.

2. The process of obtaining pure ammonia from ammoniacal liquor, which comprises distilling the liquor with steam at substantially atmospheric pressure to remove free ammonia and other volatile constituents therefrom, adding an alkaline solution or suspension to the residual liquor to liberate fixed ammonia, subjecting the so treated liquor to a second steam distillation to obtain therefrom ammonia vapor substantially free from impurities, effecting the first aforesaid distillation with separate steam from the steam for the second distillation stage and thereby substantially completely removing said other volatile constituents from the liquor prior to the second distillation stage, recovering the ammonia vapor from the second distillation stage separately from the ammonia vapor from the first aforesaid distillation stage, increasing the concentration of ammonia in the vapor recovered from the second distillation stage, by at least partial condensation of the water contained therein and returning condensate to the second distilling stage, scrubbing the residual vapor with a solvent for impurities remaining therein substantially without affecting the temperature of the vapor, cooling the vapor to condense strong ammonia liquor, and withdrawing uncondensed gases.

3. The process of obtaining pure ammonia from ammoniacal liquor, which comprises distilling the liquor to remove volatile constituents therefrom, adding alkaline material to the residual liquor to liberate fixed ammonia and to convert remaining volatile acidic compounds into substantially non-volatile compounds, thereafter subjecting the so treated residual liquor to further distillation to obtain ammonia vapor substantially free from acidic impurities, effecting the first aforesaid distilling step with separate distilling medium from the distilling medium for the further distillation step and thereby substantially completely removing the volatile acidic compounds from the liquor prior to the further distillation step, and withdrawing and recovering the said ammonia vapor from the further distilling stage separately from the ammonia vapor from the first aforesaid distilling step.

FREDERICK W. SPERR, Jr.